Oct. 27, 1970 — W. R. BELL, JR — 3,535,721

MEANS FOR EXTRACTING HONEY

Filed Jan. 27, 1969 — 2 Sheets-Sheet 1

INVENTOR:
WILLIAM ROLAND BELL, JR.

Oct. 27, 1970 — W. R. BELL, JR — 3,535,721
MEANS FOR EXTRACTING HONEY
Filed Jan. 27, 1969 — 2 Sheets-Sheet 2

INVENTOR:
WILLIAM ROLAND BELL, JR.

United States Patent Office 3,535,721
Patented Oct. 27, 1970

3,535,721
MEANS FOR EXTRACTING HONEY
William Roland Bell, Jr., Snyder, Tex. 79549
Continuation-in-part of application Ser. No. 621,397,
Mar. 2, 1967. This application Jan. 27, 1969, Ser.
No. 794,059
Int. Cl. A01k 59/00
U.S. Cl. 6—12         7 Claims

ABSTRACT OF THE DISCLOSURE

Honey is removed from the honeycomb by blowing a small jet of air into the cells of the honeycomb, thus blowing the honey therefrom.

CROSS-REFERENCE TO RELATED APPLICATIONS

This application is a continuation-in-part of my patent application Ser. No. 621,397, filed Mar. 2, 1967, entitled Automatic Honeycomb Emptying Machine, Group 331, now abandoned.

BACKGROUND OF THE INVENTION

Field of the invention

This invention relates to beekeeping and more particularly to the extraction of honey from its comb.

Description of the prior art

Extraction of honey from the honeycomb has posed a problem for beekeepers for sometime.

The removal of honey from the honeycomb presents a particular problem. The honey is a thick viscus liquid within hexagonal cells, each of the hexagonal cells being about .2 inch wide measured across the flats. However, when the comb has been uncapped and the honey in the cells undisturbed, the honey will not normally flow by gravity.

Commercially most honey is extracted by uncapping the honeycomb with a knife, then placing the honeycomb in a centrifuge and removing the honey by centrifugal force.

Other workers in the field have proposed other extraction methods, e.g., Avant, U.S. Pat. 890,397, issued June 9, 1908, suggests using a suction pump to suck the honey from the comb; however, by his method, first it was necessary to uncap the cells.

SUMMARY OF THE INVENTION

According to my invention, by blowing the honey from the honeycomb with a jet of air, the jet of air itself removes the caps from the cells of the honeycomb.

Although a single jet of air resulting from a single nozzle could be used to blow the honey from each of the cells, this is obviously not commercially feasible due to its time consumption. Therefore, according to my invention, I use a header having a plurality of nozzles. Inasmuch as the standard honeycomb is 10 inches wide, I find that a header 10 inches long with 48 nozzles it quite satisfactory. Obviously the 48 nozzles would indicate that there is a nozzle aligned approximately with each course of cells across the honeycomb. The honeycomb is so remarkable in its symmetry, generally individual cells are very uniform in size and therefore, the nozzles can be spaced uniformly.

It is not necessary to align the jet of air with the cell inasmuch as the air is more efficient in removing the honey from the cell if it enters the cell from one side. This jet of air has a dimension smaller than the dimension of a cell. The jet of air enters one side of a cell and pushes the honey out the other side.

I have found that sometimes the air pressure ruptures the bottom of a cell to a next adjacent cell. I have not found this to be particularly disadvantageous inasmuch as good removal is obtained and, also, when the comb is returned to the hive, there appears to be no loss in the production time of the honey due to the easy repair of the ruptured cell by the colony.

Specifically, I have found that air at 12 p.s.i.g. and 90° temperature in the air equalization chamber or header and discharged therefrom by holes .0159 inch in diameter (26 wire gauge) drilled through the chamber with the header spaced 3/16 of an inch from the comb is satisfactory. Although I would actually prefer to have the air nozzle closer to the comb, the physical construction of the frames in which the comb is located limits this desire.

An object of this invention is to remove honey from a honeycomb.

Further objects are to achieve the above with a device that is sturdy, compact, durable, simple, safe, versatile, lightweight, efficient, and reliable, yet inexpensive and easy to manufacture, install, operate, and maintain.

Still further objects are to achieve the above with a method that is safe, rapid, versatile, lightweight, efficient and inexpensive and does not require skilled people to install, adjust, operate and maintain.

The specific nature of the invention, as well as other objects, uses, and advantages thereof, will clearly appear from the following description and from the accompanying drawing, the different views of which are not necessarily to the same scale.

DETAILED DESCRIPTION OF THE PREFERRED EMBODIMENT

Figure 1:
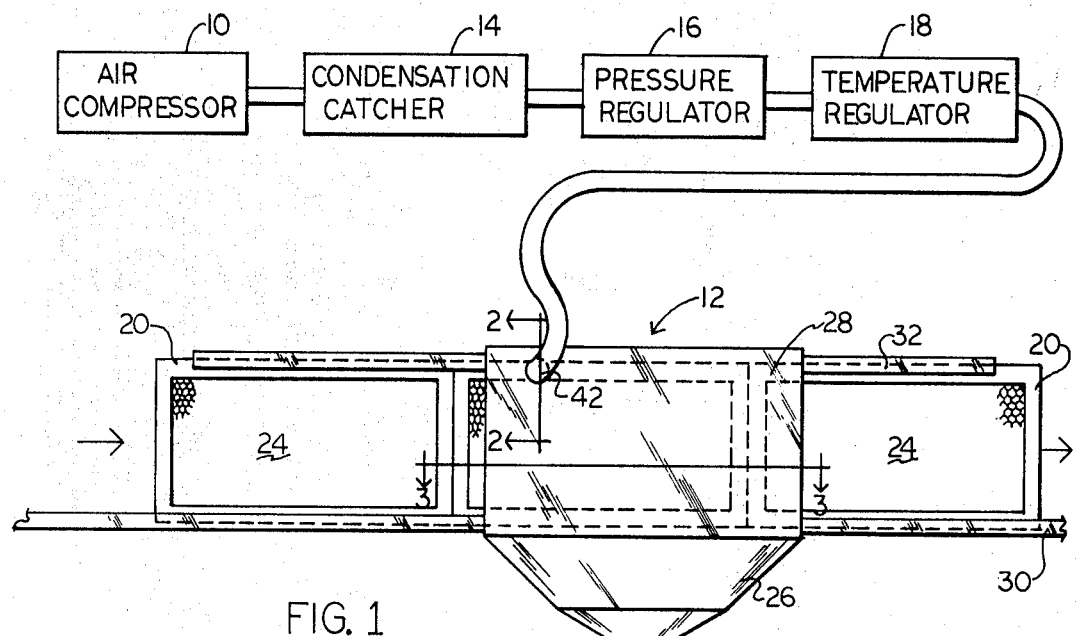
FIG. 1 is a schematic representation of an embodiment of this invention.
Figure 2:
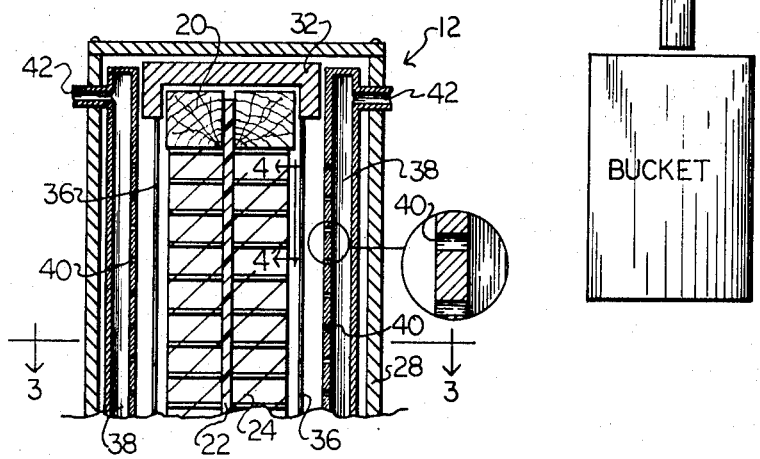
FIG. 2 is a sectional view taken substantially on line 2—2 of FIG. 1 showing the air nozzles.
Figure 3:
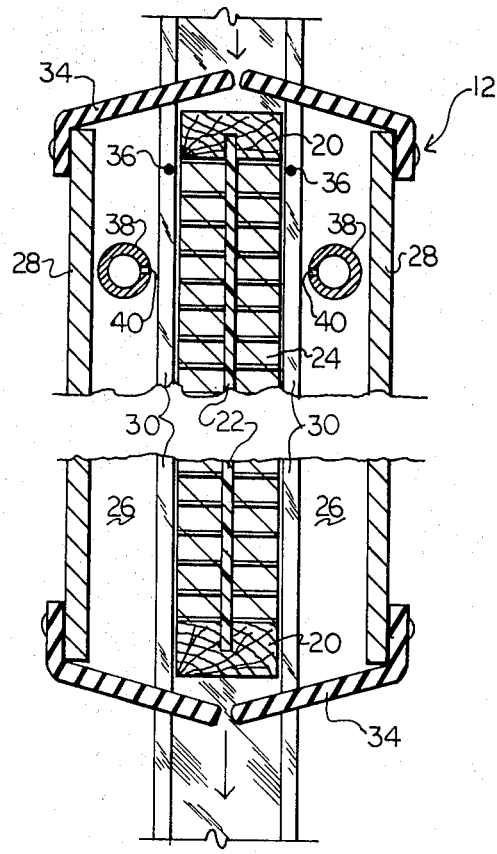
FIG. 3 is a sectional view taken substantially on line 3—3 of FIGS. 1 and 2 with parts removed for clarity showing details of construction.
Figure 4:
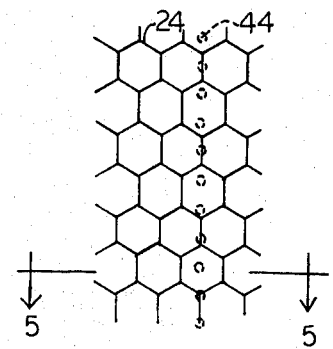
FIG. 4 is a sectional view taken substantially on line 4—4 of FIG. 2 schematically showing the jets of air as a structural element.
Figure 5:
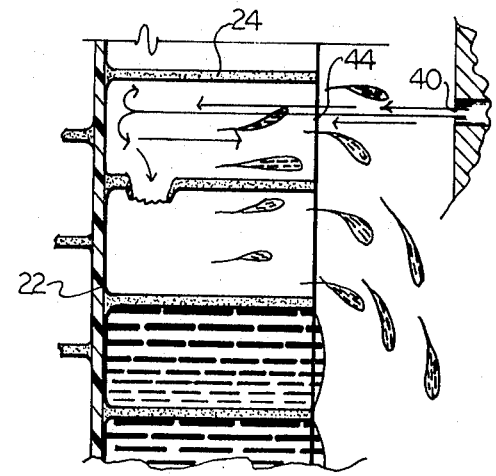
FIG. 5 is a sectional view taken substantially on line 5—5 of FIG. 4 showing the removal of the honey from the comb.

Referring more particularly to FIG. 1, it may be seen that air compressor 10 is a source of air under pressure for extractor 12. From the compressor, the air is dried by suitable condensate catcher 14 as is known in the art of air compression. Thereafter, the pressure is regulated by pressure regulator 16 such as is known and is commercially available on the market and, likewise, the temperature is regulated to 90° by regulator 18, such conventional equipment being commercially available on the market. Air compressor 10, condensation catcher 14, pressure regulator 16 and temperature regulator 18 could all be thought of as a single unit which viewed from the extractor 12 is a source of air under a regulated pressure at a regulated temperature.

The honey combs are built upon standard wooden frames 20 as well known to the beekeeping art. The frame is basically a rectangular structure made of wood and honeycomb foundation 22 is attached to the center thereof. The foundation 22 is a panel-like member attached to the frame and it is upon this foundation 22 that the bees build the honeycomb 24 which consists of the hexagonal cells.

An enclosure is formed with the funnel shaped floor 26 and side supports 28. Bottom guide rail 30 is attached to the bottom immediately above the floor 26. The rail 30 is channel shaped and the width between the flanges is such as to conveniently fit the width of the frame 20. The upper guide rail 32 is likewise channel shaped so the frame conveniently fits therein. Also it may be seen in FIG. 1 that bottom guide rail extends for a greater distance than the upper guide rail and therefore, a frame can be conveniently placed on the bottom guide rail and inserted into the upper guide rail and pushed through the extractor 12. Also it may be seen that when the frame 20 is in the guide rail, the frame is aligned with the guide rails 30 and 32.

The extractor has rubber flaps on doors 34 which extend on either side of the side-wall supports 28. Generally, the flaps or doors 34 will extend outward because of the air blowing within the extractor 12.

Adjacent where the honeycomb first enters the extractor is a pair of filament wires 36, which is well known to the art. The purpose of these filament wires is to trim any burr comb which may be projecting from the honeycomb and also to remove other comb which might project.

The filament wires are parallel to the foundation 22 and vertically oriented. Immediately adjacent to the filament wires to blow against the comb are headers or equalization chambers 38. The chambers are tubular with their axes parallel to the filament wires and thus to the foundation. Expressed otherwise, the nozzles 40 along one side of the chamber 38 will be equally spaced from the honeycomb. The equilization chambers have nipple 42 which extends outside support walls 28 and is connected by suitable conduit to the source of air under pressure.

As stated before the nozzles 40 are located as close to the honeycomb as practical considering clearance of side of the frame 20. I have found that about 3/16 of an inch is as close as is practical to place the nozzles 40 to the honeycomb. I have had good success spacing the nozzles .20 inch on center and making them the size of 26 wire (.0195 inch diameter) being supplied with 12 p.s.i.g. of air produces a suitable jet which, at this spacing, will blow into each cell of the honeycomb as the honeycomb is pushed manually slowly through the extractor to blow the honey from each cell I have found that if the cells are capped, the velocity of the air will readily uncap the cells and there is no particular damage done to the honeycomb and if some of the cells do blow out, there is no excessive damage. Any damage is readily repaired by the bees. Also as stated above, often as the honey is bown from the comb, some of it may accumulate along the edges; however, I have found that it will be blown or trickle off the surface of the honeycomb rather than re-entering the cells.

It will be understood that the purpose of the embodiment described is to place air nozzles adjacent to the honeycomb. Therefore, the structure can take many different forms and it is within my concept that a bifurcated equalization chamber could be used somewhat resembling a tuning fork and held by the hand and passed over the honeycomb in situ.

The embodiment shown and described above is only exemplary. I do not claim to have invented all the parts, elements or steps described. Various modifications can be made in the construction, material, arrangement, and operation and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. An extractor for removing honey from
   (a) a plurality of hexagon-shaped cells of uniform size forming
   (b) a honeycomb on each side of a
   (c) foundation which is mounted within
   (d) a frame;
   (e) comprising in combination:
   (f) a support,
   (g) guide rail means for guiding the frame so that the foundation is in alignment to the guide rail means,
   (h) said guide rail means attached to the support,
   (j) at least one tubular air pressure equalization chamber attached to the support with
   (k) the axis of the chamber parallel to the foundation,
   (m) a plurality of nozzles in the equilization chamber directed toward the honey comb, and
   (n) a source of air under pressure fluidly connected to the equalization chamber.

2. The invention as defined in claim 1 with the additional limitation of
   (o) filament wires attached to the guide rail
   (p) parallel to the foundation to trim burr comb from the honeycomb so the cells are at least a minimum distance from the nozzles.

3. The invention as defined in claim 1 with the additional limitations of
   (o) at least two equalization chambers, one on each side the foundation.

4. The invention as defined in claim 3 with the additional limitations of
   (p) filament wires attached to the guide rail
   (q) parallel to the foundation to trim burr comb from the honeycomb so the cells are at least a minimum distance from the nozzles.

5. The invention as defined in claim 3 with the additional limitations of
   (p) means attached to said source of air under pressure for regulating the pressure on the equalization chamber at 12 p.s.i.g.

6. The invention as defined in claim 3 with the additional limitations of
   (p) means attached to said source of air under pressure for regulating the temperature of the air entering the equalization chamber.

7. The invention as defined in claim 3 with the additional limitations of
   (p) said nozzles spaced from the cells by about 3/16 of an inch.

References Cited
UNITED STATES PATENTS

| 890,397 | 6/1908 | Avant. | |
| 900,643 | 10/1908 | Avant | 6—12 |

FOREIGN PATENTS

| 965,968 | 2/1950 | France. |

LUCIE H. LAUDENSLAGER, Primary Examiner